Charles Kaulbeck's Improvement in the Manufacture of
the hooks of Blind or Shutter Hinges.

73533

PATENTED
JAN 21 1868

Witnesses
H. P. Hale Jr
J. A. Snow

Charles Kaulbeck
by his attorney
R. W. Mudy

United States Patent Office.

CHARLES KAULBECK, OF BOSTON, MASSACHUSETTS, ASSIGNOR TO HIMSELF AND WATSON W. ROBERTS, OF SAME PLACE.

*Letters Patent No. 73,533, dated January 21, 1868.*

IMPROVEMENT IN MANUFACTURE OF HINGE-HOOKS.

*The Schedule referred to in these Letters Patent and making part of the same.*

TO ALL PERSONS TO WHOM THESE PRESENTS MAY COME:

Be it known that I, CHARLES KAULBECK, of Boston, in the county of Suffolk, and State of Massachusetts, have invented a new and useful Improvement in the Manufacture of the Hooks of Blind or Shutter-Hinges; and I do hereby declare the same to be fully described in the following specification, and represented in the accompanying drawings, of which—

Figure 1 denotes a hook of the kind to which my invention applies.

Figure 1:
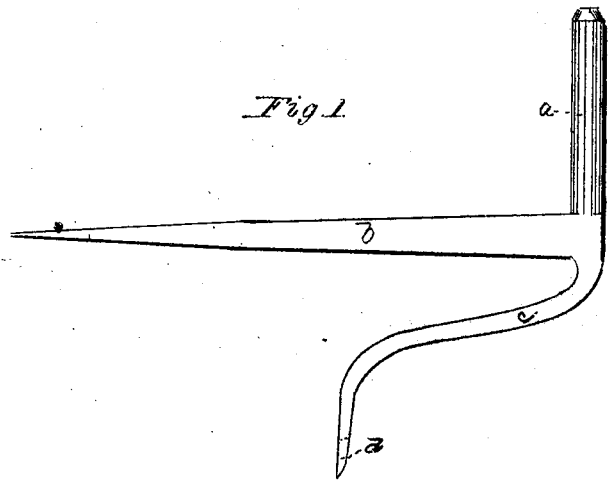

The common method of making a blind-hinge hook, which consists of a cylindrical spindle, a furcated shank, $b$, and a brace, $c$, arranged and connected in manner as shown in fig. 1, the brace having a screw-hole, $d$, made through its lower part, is well known to smiths or workers in iron, and involves the welding of the parts together. By my process, I save the welding, and much of the labor usually required, and make an article much stronger and better.

Figure 3:
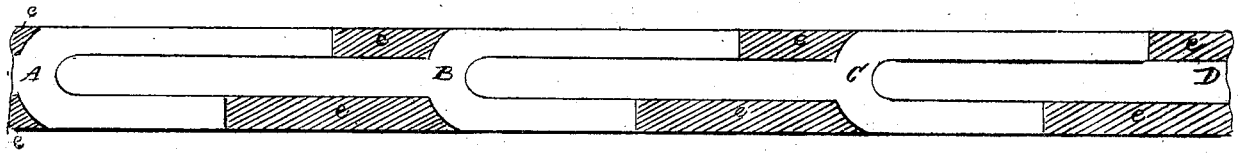
Figure 3 is a side view of one of the blanks used in the manufacture of a hook in accordance with my invention.
Figure 2:
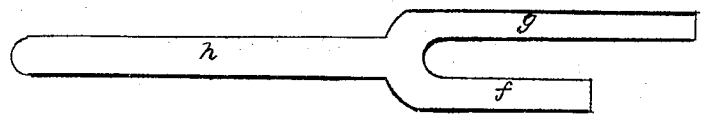
Figure 2 is a diagram, illustrative of the arrangement of the hook-blanks as they are stamped from a strip of sheet metal.

In carrying out my invention, I stamp, by means of dies, and from a strip of plate metal of suitable width, a series of forks or furcated blanks, each having the form shown in fig. 3. In stamping them from the strip, I cause the shank of one to be formed, in part or in whole, of the metal removed, to make the opening between the prongs of the next blank, the arrangement of blanks to effect such being as shown at A B C D in fig. 2. In this way, I form into blanks the whole strip, with the exception of the shaded parts, marked $e$. After each blank has been so made, I heat to redness its shank, $h$, (see fig. 3,) and hammer it out, and point it, after which I so heat the prongs $f$ and $g$, turn up the prong $f$ into a right angle with the shank, and hammer out or otherwise reduce the said prong to a cylindrical form. Next, I shape the prong $g$ to the form of the brace $c$, and finally bend it, with respect to the shank, in manner as shown in fig. 1. Thus, I save all welding of separate pieces of wire, as in the common mode of making the hinge-hooks, and I am enabled to produce the hooks with far less labor and expense, and, besides, make stronger and better ones than those constructed of separate pieces welded together.

I claim the mode, substantially as above described, of manufacturing shutter or blind-hinge hooks.

CHARLES KAULBECK.

Witnesses:
R. H. EDDY,
SAMUEL N. PIPER.